(12) United States Patent
Okano (10) Patent No.: US 6,741,964 B2
(45) Date of Patent: May 25, 2004

(54) DATA TRANSFER SYSTEM AND DATA TRANSFER METHOD

(75) Inventor: Hideo Okano, Hanno (JP)

(73) Assignee: Olympus Optical Co., Ltd., Tokyo (JP)

( * ) Notice: Subject to any disclaimer, the term of this patent is extended or adjusted under 35 U.S.C. 154(b) by 492 days.

(21) Appl. No.: 09/756,063

(22) Filed: Jan. 8, 2001

(65) Prior Publication Data

US 2001/0054167 A1 Dec. 20, 2001

(30) Foreign Application Priority Data

Jan. 13, 2000 (JP) ........................ 2000-004692

(51) Int. Cl.$^7$ .................. G10L 21/06; G10L 15/26; G10L 15/22
(52) U.S. Cl. .................. 704/270; 704/235; 704/231; 704/251
(58) Field of Search ................. 704/500–503, 704/201–230; 360/18; 369/366; 714/704, 718, 746, 807, 759, 795; 379/88.18; 386/33; 375/249, 371, 366

(56) References Cited

U.S. PATENT DOCUMENTS

| | | | | |
|---|---|---|---|---|
| 3,906,367 A | * | 9/1975 | Hoeschele et al. | 375/249 |
| 4,790,003 A | * | 12/1988 | Kepley et al. | 379/88.18 |
| 4,843,617 A | * | 6/1989 | Marshall et al. | 375/371 |
| 5,212,715 A | * | 5/1993 | Pickert et al. | 375/366 |
| 5,278,866 A | * | 1/1994 | Nonami | 714/718 |
| 5,491,700 A | * | 2/1996 | Wright et al. | 714/759 |
| 5,587,803 A | * | 12/1996 | Inoue et al. | 386/33 |
| 5,632,001 A | * | 5/1997 | Terauchi | 704/201 |
| 5,646,795 A | * | 7/1997 | Suzuki | 360/18 |
| 5,928,379 A | * | 7/1999 | Hattori | 714/807 |
| 5,968,201 A | * | 10/1999 | Shida et al. | 714/795 |
| 6,148,422 A | * | 11/2000 | Strawczynski et al. | 714/704 |
| 6,151,580 A | * | 11/2000 | Bacher et al. | 704/503 |
| 6,298,057 B1 | * | 10/2001 | Guy et al. | 714/746 |
| 6,320,829 B1 | * | 11/2001 | Matsumoto et al. | 369/47.12 |

FOREIGN PATENT DOCUMENTS

JP 2001-195090 * 7/2001 .......... G01L/19/00

* cited by examiner

*Primary Examiner*—Richemond Dorvil
*Assistant Examiner*—Daniel Nolan
(74) *Attorney, Agent, or Firm*—Frishauf, Holtz, Goodman & Chick, P.C.

(57) ABSTRACT

When recording digital data corresponding to a voice signal, a voice data recording and reproducing apparatus generates an error correction code and records this code together with the digital data in semiconductor memory. When transferring the digital data to the PC, a system control section in the voice data recording and reproducing apparatus transmits voice data including the error correction code without performing error correction. The system control section provides a lower data processing capability than that of a PC's CPU. The PC's CPU having a higher data processing capability performs error correction of the voice data by using the error correction code included in the received voice data.

7 Claims, 7 Drawing Sheets

| BYTE NUMBER | CONTENT | FILED SIZE (BYTES) |
|---|---|---|
| 0 | END-OF-FILE FLAG | 1 |
| 1 | ECC FLAG | 1 |
| 2 - 257 | ENCODED DATA 1 | 256 |
| 258 - 513 | ENCODED DATA 2 | 256 |
| 514 - 521 | RESERVED | 8 |
| 522 | ECC22 | 1 |
| 523 | ECC21 | 1 |
| 524 | ECC23 | 1 |
| 525, 526 | RESERVED | 2 |
| 527 | ECC12 | 1 |
| 528 | ECC11 | 1 |
| 529 | ECC13 | 1 |

DATA TRANSFER SYSTEM AND DATA TRANSFER METHOD

CROSS-REFERENCE TO RELATED APPLICATIONS

This application is based upon and claims the benefit of priority from the prior Japanese Patent Application No. 2000-4692, filed Jan. 13, 2000; the entire contents of which are incorporated herein by reference.

BACKGROUND OF THE INVENTION

The present invention relates to a data transfer system and a data transfer method for transferring data between a transmission apparatus and a reception apparatus.

Generally, dictation is one of the uses of a voice recording and reproducing apparatus, namely a tape recorder. For example, dictation uses the tape recorder to record on a recording tape the content of a read-aloud document to be created on paper. The recorded tape is handed over to a secretary or the like. The secretary or the like plays back the recording tape and types the document by listening to the played back voice. Alternatively, the content of a meeting may be recorded for later creating minutes by listening to the recorded content.

In recent years, an increasing demand for compactness has encouraged development of a voice recording and reproducing apparatus which uses semiconductor memory as a storage medium instead of a magnetic tape.

Some such apparatuses using semiconductor memory for recording voice data make the semiconductor memory undetachable from the body of the apparatus. When this apparatus is used for the dictation, the recorded voice data needs to be submitted to the secretary or the like for typing. It may be necessary to use voice data recorded in this semiconductor memory on an external apparatus such as a voice reproduction apparatus other than the voice data recording and reproducing apparatus. In this case, a cable or the like is connected to the external apparatus to transfer the voice data.

Along with the widespread use of personal computers (PCs), a PC-based word processor is used for typing in most cases. Many PCs have a sound capability, making it possible to reproduce voice data from a speaker connected to the PC. It is becoming an increasingly popular practice to transfer the voice data from the voice data recording and reproducing apparatus to the PC and use the word processor for typing by playing back the voice data on the PC.

Incidentally, it is becoming commonplace to use PCs having the USB (Universal Serial Bus) interface specification which is compliant with the so-called Plug and Play capability and enables connection of many devices. Using the USB connection makes it possible to extremely fast transfer voice data from the voice data recording and reproducing apparatus to the PC compared to conventional data transfer using connection of a cable such as a serial cable.

On the other hand, when transferring data to the PC, the conventional voice data recording and reproducing apparatus needs to apply error correction to voice data read from the semiconductor memory such as flash memory. Generally, the voice data recording and reproducing apparatus uses a less powerful central processing unit (CPU). Despite the use of the USB path capable of fast data transfer, the time needed for this error correction bottlenecks a high-speed data transfer.

OBJECT OF THE INVENTION

In view of the above-described drawbacks in the prior art, it is an object of the present invention to provide a data transfer system and a data transfer method capable of high-speed data transfer.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figure 1:
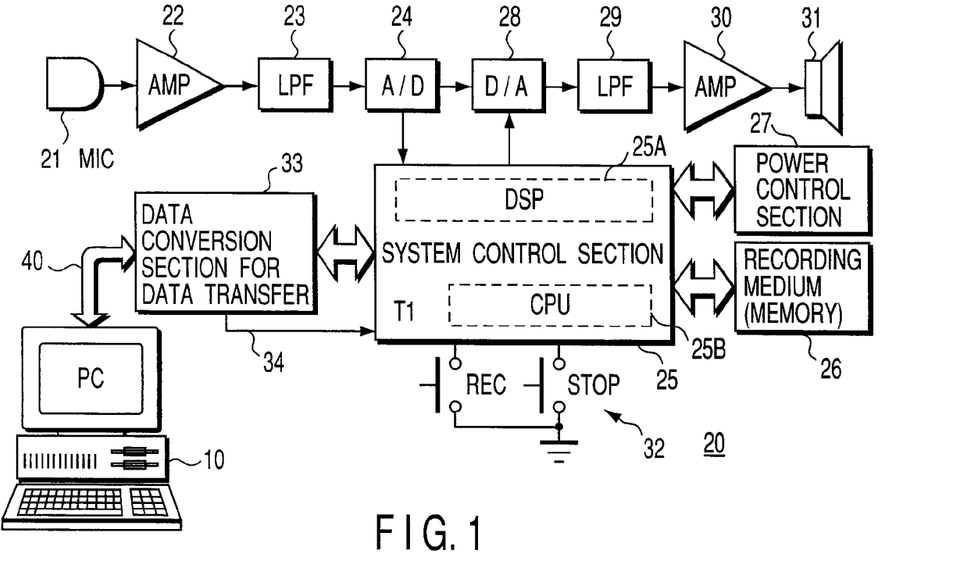
FIG. 1 shows a configuration of a data transfer system according to an embodiment of the present invention.

FIG. 1 shows a configuration of a data transfer system according to an embodiment of the present invention. The data transfer system comprises a PC 10 as transmission apparatuses which can connect with a plurality of data recording and reproducing apparatuses and can transfer data to the data recording and reproducing apparatuses. The system further comprises a voice data recording and reproducing apparatus 20 which is one of transmission apparatuses configured as a plurality of USB devices connected to the PC 10.

In the voice data recording and reproducing apparatus 20, a microphone (MIC) 21 connects with a system control section 25 via an amplifier (AMP) 22, a low-pass filter (LPF) 23, and an analog/digital (A/D) converter 24. The system control section 25 contains a digital signal processing section (DSP) 25A and a CPU 25B. The DSP 25A functions as an encoding/decoding circuit for compressing or decompressing voice data. The CPU 25B controls each section in the voice data recording and reproducing apparatus 20. The system control section 25 connects with nonvolatile semiconductor memory 26 as a medium for storing voice data and a power control section 27. Further, the system control section 25 connects with a speaker 31 via a digital/analog (D/A) converter 28, an LPF 29, and a power amplifier 30.

Furthermore, the system control section 25 connects with an operation/input section 32. The operation/input section 32 includes not only a recording button REC and a stop button STOP, but also a playback button, a fast-forward button, a rewind button, an I-mark button, an E-mark button, an endless recording button, and the like, though not shown.

The I-mark and the E-mark have the following functions. The semiconductor memory 26 can store a plurality of voice data entries. When the voice data recording and reproducing apparatus 20 is used for dictation, for example, a narrator can use the I-mark button to record an instruction (I) mark during operation. This I-mark indicates priorities among a plurality of voice data entries stored in the semiconductor memory 26 and is used as an index mark for giving instructions to a typist or a secretary. Accordingly, the narrator can use this I-mark to concretely specify priorities by his or her voice. The E-mark button can be used to record an end (E) mark. This E-mark is an index mark for indicating a separation between a plurality of voice data entries.

The system control section 25 connects with a data conversion section 33 for data transfer so as to communicate with the PC 10 via a USB cable 40. The data conversion section 33 for data transfer provides means for receiving signals from an external device such as a PC, means for sending a connection completion signal to an external device, and means for sending data. When the USB cable 40 is connected, the data conversion section 33 for data transfer supplies a connection confirmation signal 34 to a terminal T1 of the system control section 25.

In the voice data recording and reproducing apparatus 20, an analog signal input from the MIC 21 is amplified in the AMP 22. The amplified signal passes the LPF 23, and then is converted to a digital signal in the A/D converter 24. The signal is input to the system control section 25 for coding. The coded data is stored in the semiconductor memory 26. At this time, one voice data entry separated by the E-mark is recorded as one file.

The system control section 25 reads and encodes data stored in the semiconductor memory 26. The encoded read data is input to the D/A converter 28. The data is converted to an analog signal via the LPF 29. The signal output from the LPF 29 is amplified in the power amplifier 30 and is externally output as sound from the speaker 31.

When data is stored in the semiconductor memory 26, an error correction code is provided during recording every n-byte block, for example, every 512 bytes as a packet unit in a file. During playback, the system control section 25 uses the error correction code to perform error correction processing for data read from the semiconductor memory 26, and then perform decoding.

Data stored in the semiconductor memory 26 is read by the system control section 25 and is input to the data conversion section 33 for data transfer. The data is then input to an external connection interface of the PC 10 via the USB cable 40. The data is processed by data conversion here and is sent to the CPU (not shown) of the PC 10. It is assumed that the CPU of the PC 10 provides a data processing capability superior to that of the CPU 25B of the voice data recording and reproducing apparatus 20. In this case, as will be described later in greater detail, when a predetermined data unit of, for example. 512-byte data is read from the semiconductor memory 26, it is transferred as is without error correction.

The following describes operations of the PC 10 capable of connecting a plurality of voice data recording and reproducing apparatuses 20 having this configuration.

Figure 2:
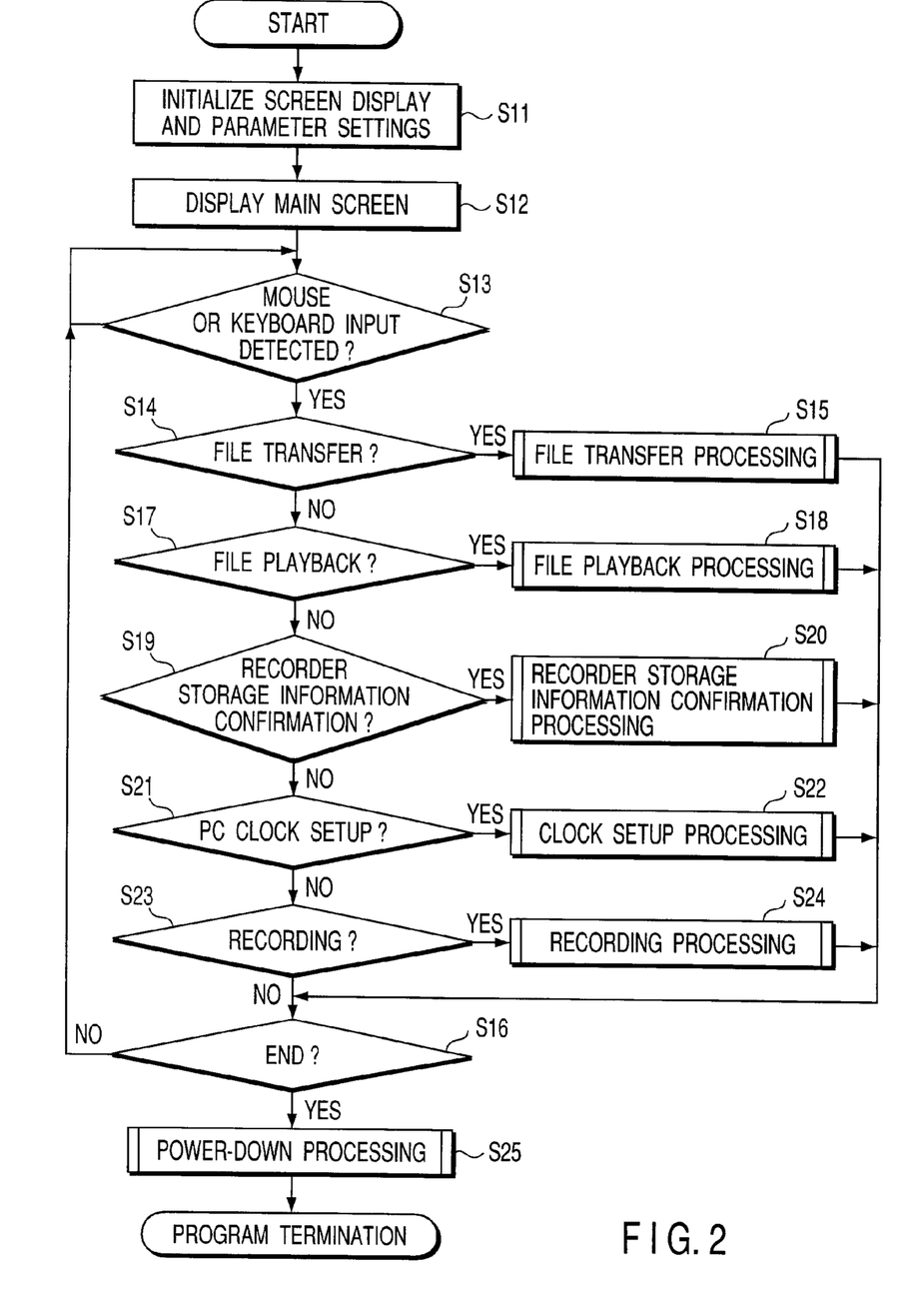
FIG. 2 shows a flowchart of a control program executed on a PC.

FIG. 2 shows a flowchart of a control program for the voice data recording and reproducing apparatus 20 executed on the PC 10.

When this control program is started, the program initializes screen display and parameter settings (step S11). During this initialization, the program investigates all currently connected USB-compliant devices to create a connection table. Then, based on this connection table, the program performs control changeover (parameter setup) for the voice data recording and reproducing apparatus 20 as an intended USB device.

Figure 3:
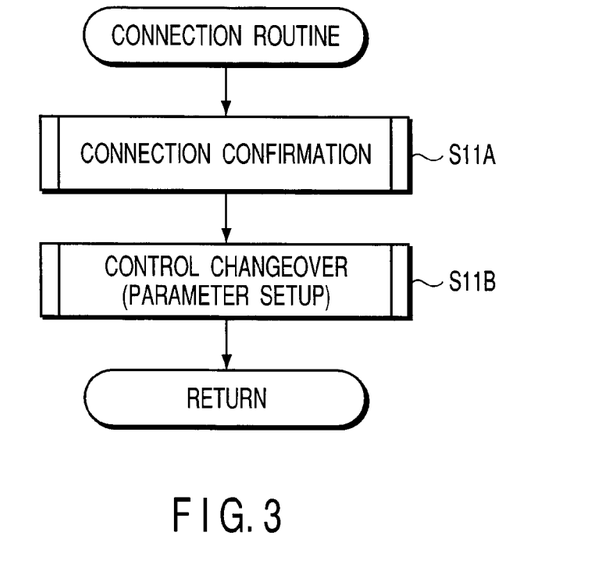
FIG. 3 shows a flowchart of a connection routine for the PC as a data processing apparatus.

Namely, this initialization allows a connection routine as shown in FIG. 3 to be executed for setting parameters. This connection routine first calls a connection confirmation subroutine which investigates all currently connected USB-compliant devices and creates a connection table (step S11A). Then, based on this connection table, the routine calls a control changeover (parameter setup) subroutine for the voice data recording and reproducing apparatus 20 as an intended USB device (step S11B).

Figure 4:
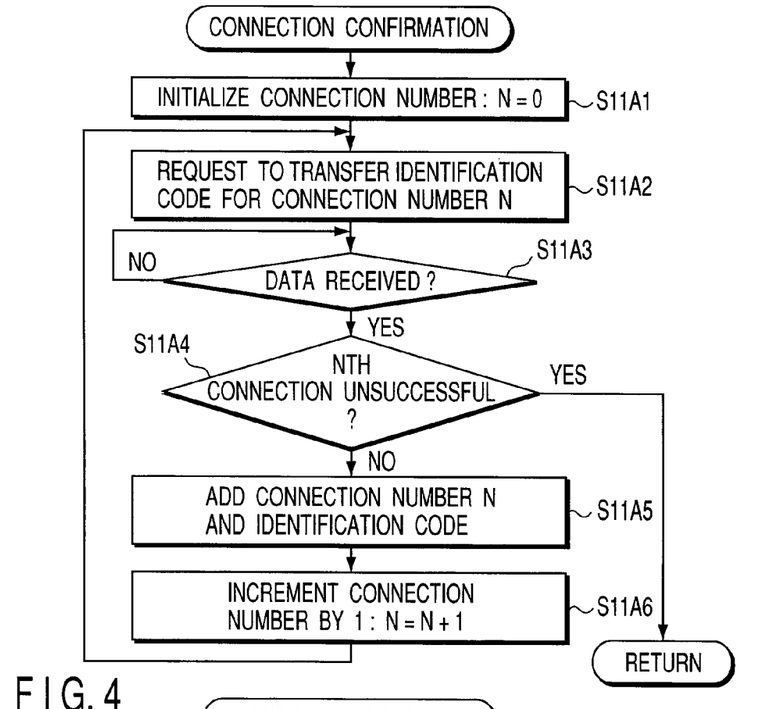
FIG. 4 shows a flowchart of a connection confirmation subroutine in FIG. 3.

FIG. 4 details the connection confirmation subroutine at the step S11A. First, for initializing a connection number, an internal counter N (not shown) is reset to 0 (step S11A1). Then, an identification code transfer request is sent to a USB device with a connection number N indicated by this counter N (step S11A2). The PC awaits data (identification code) to receive for a specified period (step S11A3). Whether or not the data is received determines whether the Nth USB device is connected (step S11A4). When that device is not connected, this connection confirmation subroutine terminates and control then returns to the higher-order connection routine. On the other hand, when that device is connected, this connection number (N) and the received identification code is appended to the connection table in RAM (not shown) in the PC 10 (step S11A5). Here, the identification code includes, for example, the corresponding USB device's model name (connected device type) or user ID information (ID number). The PC then increments the connection number N indicated by the counter N by 1 (step S11A6), returns to step S11A2, and issues an identification code transfer request to the next USB device. Repeating steps S11A2 to S11A6 creates the connection table, a list of all connected USB devices.

This embodiment assumes that connection numbers sequentially from 0 are automatically assigned to devices connected to the PC 10.

Figure 5:
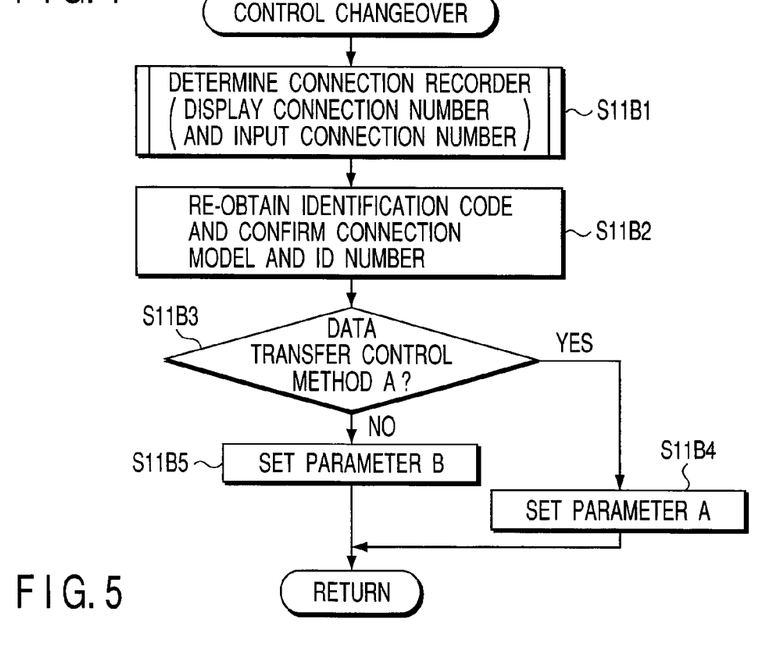
FIG. 5 shows a flowchart of a control changeover subroutine in FIG. 3.

FIG. 5 details the control changeover (parameter setup) subroutine at the step S11B. First, a connection recorder determination process is performed (step S11B1). In this step, a list of all USB devices connected to the PC 10 recorded in the connection table, i.e., connection numbers is displayed on a PC monitor. When a user enters a desired connection number, it is accepted to select the voice data recording and reproducing apparatus (recorder) 20 as a USB device specified by the user. Then, the identification code is re-obtained from the device corresponding to the connection number selected by the user and that code is compared with the corresponding identification code (connected device type and ID number) in the connection table (step S11B2). This step is needed for ensuring the specified USB device in the following case. The connection confirmation subroutine confirms connection of a USB device to be connected posterior to the USB device whose connection is already confirmed. Meanwhile, this confirmed USB device may be disconnected or newly added to the end of a sequence of connected devices.

Then, it is checked whether a data transfer control method A is used for the above-mentioned USB device, namely the voice data recording and reproducing apparatus 20 in this case (step S11B3). For doing this, the PC 10 can maintain a determination criterion such as correspondence between a model name and a control method. Alternatively, it is also possible to store a control method for the voice data recording and reproducing apparatus 20 in its semiconductor memory 26 and send this information to the PC 10 so that the PC 10 can check it.

When the data transfer control method A is detected, a corresponding parameter A is selected (step S11A4). Otherwise, a parameter B corresponding to a data transfer control method B is selected (step S11A5). This example uses two types of data transfer control methods. Obviously, it may be preferable to use three or more methods.

After the initialization, the PC 10 displays a main screen for controlling the voice data recording and reproducing apparatus 20 on the monitor (step S12). The PC 10 awaits input from a mouse or a keyboard (step S13).

When an input from the mouse or the keyboard specifies file transfer processing (step S14), a file transfer processing subroutine which will be described later in detail is called to receive a file from the voice data recording and reproducing apparatus 20 via the USB cable 40 (step S15). Then, it is checked if a mouse or keyboard input specifies termination of this control program (step S16). If no termination is specified, control returns to the step S13.

When a mouse or keyboard input specifies file playback (step S17), a file playback processing subroutine is called (step S18). In the file playback processing subroutine, a file playback command is sent to the voice data recording and reproducing apparatus 20 and a specified file is reproduced in this apparatus 20. Thereafter, control advances to the step S16.

When a mouse or keyboard input specifies recorder storage information confirmation (step S19), a recorder storage information confirmation process subroutine is called (step S20). In this subroutine, a record count confirmation command is sent to the voice data recording and reproducing apparatus 20. Then, the number of records stored in the semiconductor memory 26 is returned from the voice data recording and reproducing apparatus 20 and this number of records is displayed on the monitor. Control then advances to the step S16.

When a mouse or keyboard input specifies PC clock setup (step S21), a clock setup processing subroutine is called (step S22). In the clock setup processing subroutine, a clock setup command (including time data measured by the PC's built-in clock) is sent to the voice data recording and reproducing apparatus 20 and this apparatus 20's built-in clock is synchronized with the PC 10's clock. Control then advances to the step S16.

When a mouse or keyboard input specifies recording (step S23), a recording processing subroutine is called (step S24). In the recording processing subroutine, a recording command is sent to the voice data recording and reproducing apparatus 20 and this apparatus 20 records data in the semiconductor memory 26. Control then advances to the step S16.

If it is determined that termination of the control program is specified at step S16, a power-down processing subroutine is called (step S25). In the power-down processing subroutine, a command for lowering power of the voice data recording and reproducing apparatus 20 is sent to it and this apparatus 20 switches to power-saving mode.

In the voice data recording and reproducing apparatus 20, the system control section 25 operates as follows though not shown in the figure.

When a power switch (not shown) is turned on, the system control section 25 initializes internal work memory, registers, and the like (not shown), determines which operation button in the operation/input section 32 is manipulated, and then performs processing according to an operation of the manipulated button. Namely, when the recording button REC is pressed, a recording processing is performed. When a playback button (not shown) is pressed, a playback processing is performed. Further, when a fast-forward button (not shown) is pressed, a fast-forward processing is performed. When a rewind button (not shown) is pressed, a rewind processing is performed. These recording, playback, fast-forward, and rewind processings are same as those for the prior art and a detailed description is omitted for simplicity.

Figure 6:
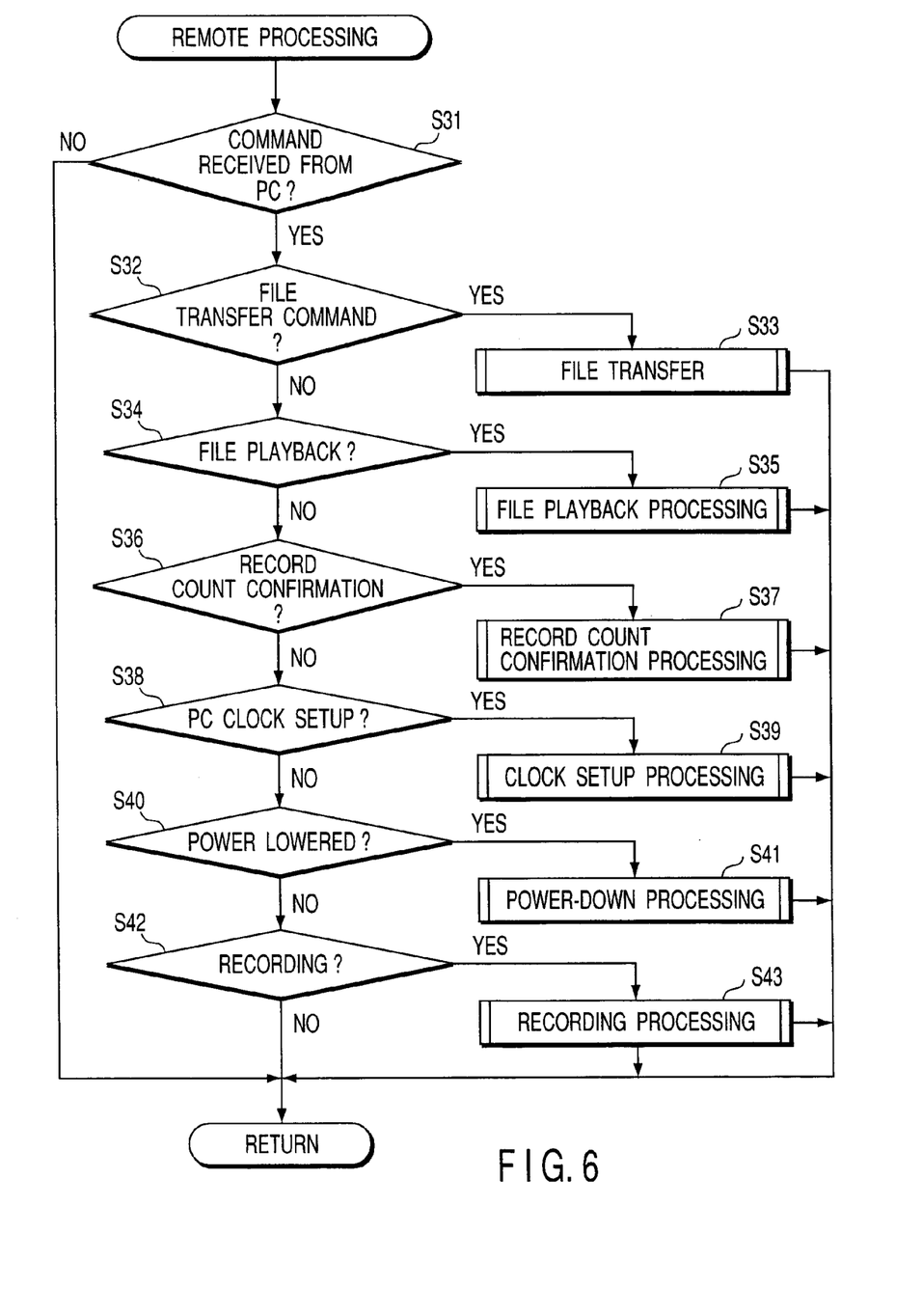
FIG. 6 shows a flowchart of remote processing in a voice data recording and reproducing apparatus.

When no operation button is pressed, the connection confirmation signal 34 from the data conversion section 33 for data transfer is used to check whether the connector of the USB cable 40 is connected. When the connector is connected, the system control section 25 performs processing according to an identification code transfer request or a remote operation request from the PC 10, if any. Namely, during the initialization at the step S11, the system control section 25 receives an identification code transfer request from the PC 10 via the data conversion section 33 for data transfer and the USB cable 40. The system control section 25 then reads a recorder identification code and transfers it to the PC 10. The recorder identification code is unique identification information managed by the pertinent voice data recording and reproducing apparatus 20 and is stored in a specified area in the nonvolatile semiconductor memory 26 as a storage medium. When receiving remote operation request (command) from the PC 10 via the USB cable 40 and the data conversion section 33 for data transfer in the subroutines at the steps S15, S18, S20, S22, S24, and S25, the system control section 25 executes a remote processing subroutine as shown in FIG. 6.

First, it is checked if a command is received from the PC 10 (step S31).

When no command is received, control returns to the higher-order connection processing subroutine.

On the other hand, when receiving any command, it is checked if the command is the file transfer command to be sent at the step S15. If this is true, the file transfer processing is performed (step S33). As will be described later in detail, in this file transfer processing, voice data for a file requested by the PC 10 is read from the semiconductor memory 26, the read data is supplied to the data conversion section 33 for data transfer, and then is transferred to the PC 10 via the USB cable 40. Control then returns to the higher-order connection processing subroutine.

When the file reproduction command at the step S18 is transferred from the PC 10 (step S34), voice data for the specified file is read from the semiconductor memory 26 and is played back from the speaker 31 according to the above-mentioned processing (step S35). Control then returns to the higher-order connection processing subroutine.

When the record count confirmation command to be transferred at the step S20 is received (step S36), it is referenced the semiconductor memory 26 to confirm the number of records, then a record count is displayed on the display section not shown (step S37). It is also possible to display this record count information on the monitor of the PC 10 by sending this information to the PC 10 via the data conversion section 33 for data transfer and the USB cable 40. Control then returns to the higher-order connection processing subroutine.

When receiving the PC clock setup command transferred at the step S22 (step S38), a built-in clock (not shown) is synchronized with the PC 10's clock (step S39). Control then returns to the higher-order connection processing subroutine.

When receiving the power lowering command sent at the step S25 from the PC 10 (step S40), the power control section 27 is used to enable the power-saving mode for decreasing the power consumption (step S41). Control then returns to the higher-order connection processing subroutine.

When receiving the recording command sent at the step S24 (step S42), the subroutine records voice data input from the MIC 21 as mentioned above (step S43). Control then returns to the higher-order connection processing subroutine.

Figure 7:
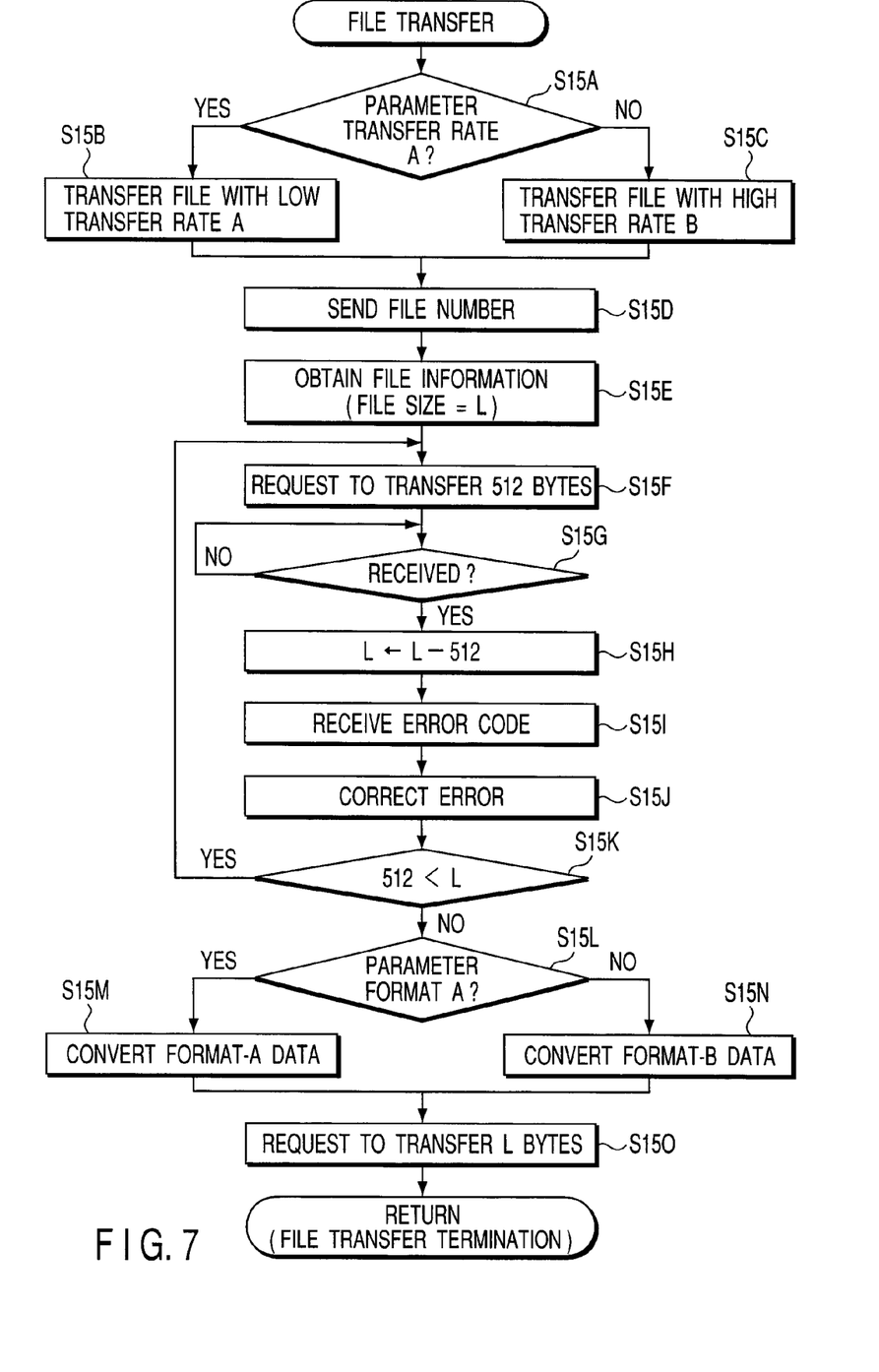
FIG. 7 shows a flowchart of a file transfer subroutine for the PC as a reception apparatus.
Figure 8:
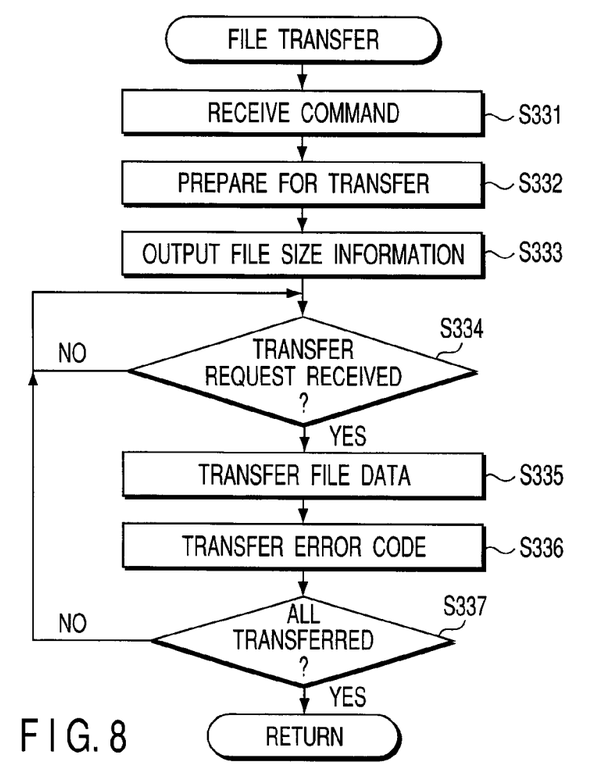
FIG. 8 shows a flowchart of a file transfer subroutine for the voice data recording and reproducing apparatus as a transmission apparatus.
Figure 9:
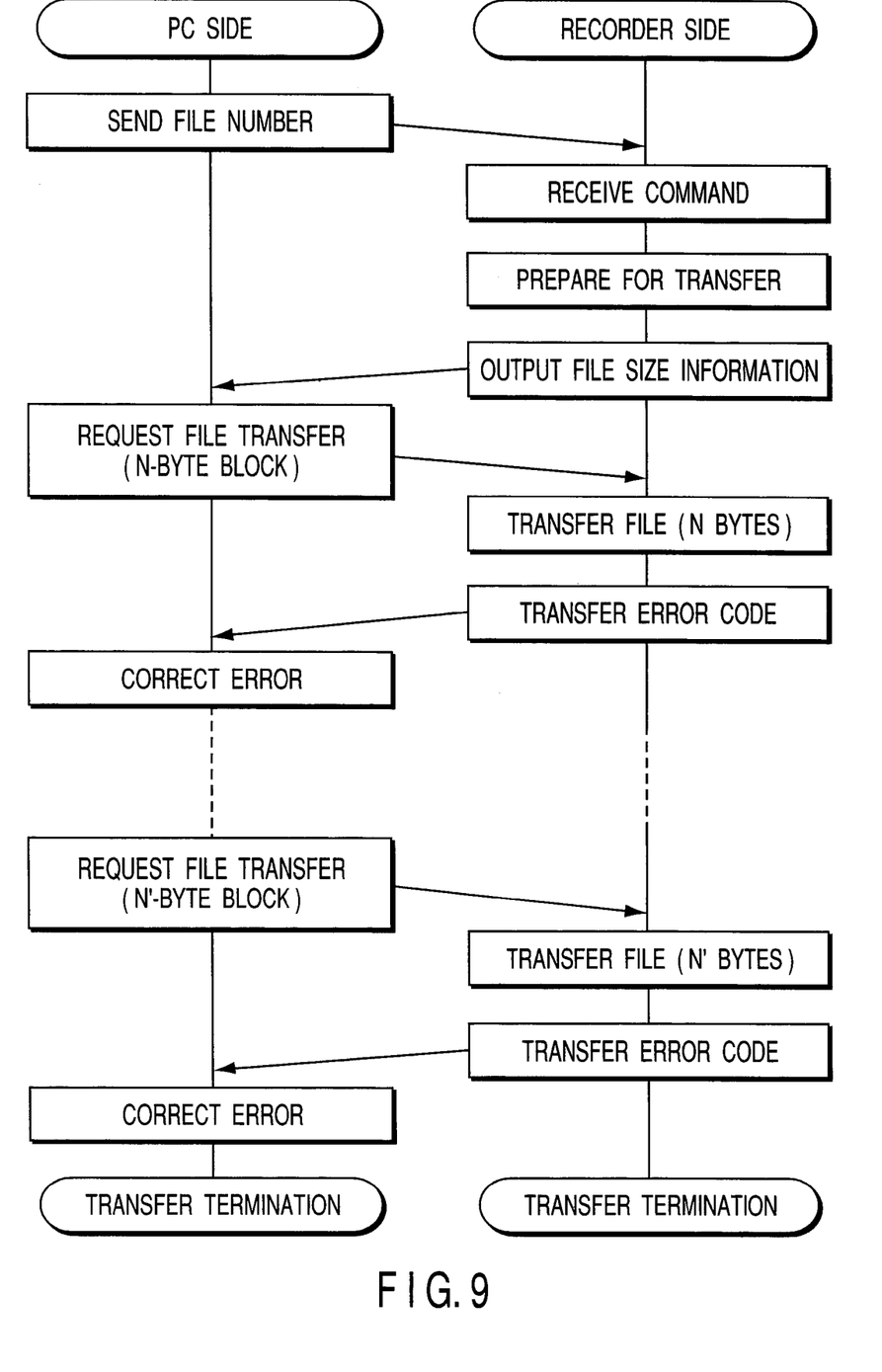
FIG. 9 illustrates an explained of the communication procedure between the PC and voice data recording and reproducing apparatus.

During the file transfer processing at the step S33, the PC 10 calls the file transfer subroutine at the step S15 as shown in FIG. 7. The voice data recording and reproducing apparatus 20 executes the file transfer processing subroutine as shown in FIG. 8. FIG. 9 shows communication procedure between the PC 10 and the voice data recording and reproducing apparatus 20 at this time.

The PC 10 checks if the parameter specified at the step S11A4 or S11A5 corresponds to transfer rate A (step S15A). If this is true, the PC 10 uses the setting-A transfer rate, namely the slow transfer, for example, at 1.5 Mbps (step S15B). Otherwise, the PC 10 uses the setting-B transfer rate, namely the fast transfer, for example, at 12 Mbps (step S15C). When a user specifies a file to be transferred, the PC 10 sends the corresponding file number to the voice data recording and/or reproducing apparatus 20 via the USB cable 40 (step S15D).

The system control section 25 in the voice data recording and reproducing apparatus 20 receives the file number of the file to be transferred (step S331). As a transfer preparation, this section 25 reads file information about that file such as a file size (L) and the like from the semiconductor memory 26 (step S332). The section 25 then transfers that file information to the PC 10 (step S333).

The PC 10 obtains the file information sent from the voice data recording and reproducing apparatus 20 (step S15E). The PC 10 sends a signal requesting transfer of an n-byte block, for example, 512-byte data as a packet unit in the file and the error correction code to the voice data recording and reproducing apparatus 20 (step S15F), and then enters a reception wait state (step S15G).

When receiving the data transfer request (step S334), the voice data recording and reproducing apparatus 20 transfers a predetermined data unit of, for example, 512-byte data as a packet unit to the PC 10 (step S335). At this time, the system control section 25 in the voice data recording and reproducing apparatus 20 reads voice data from the semiconductor memory 26 and transfers this data as is without the error correction needed for playback. The 6-byte error correction code is appended to the 512-bye data and is stored in the semiconductor memory 26. This error correction code is transferred to the PC (step S336)

Figure 10:
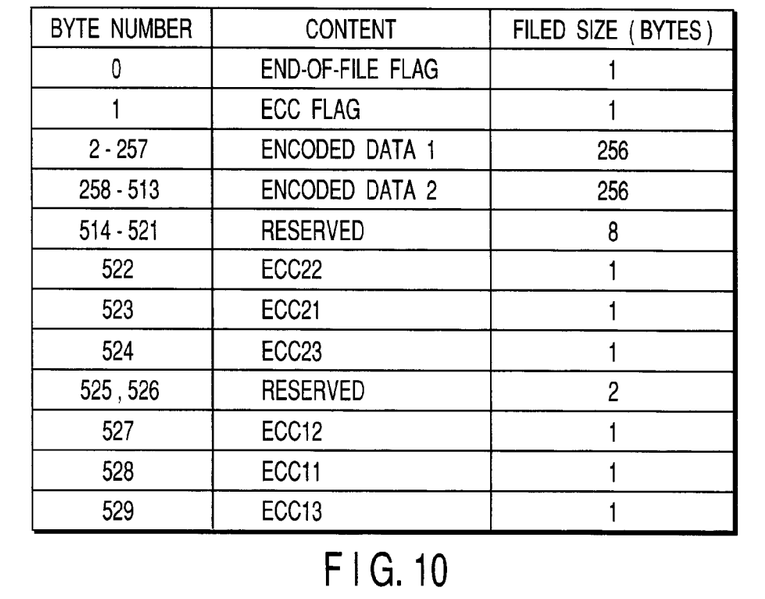
FIG. 10 illustrates a data structure transferred to a PC 10 from a voice data recording and reproducing apparatus 20.

The following describes a structure of data transferred to the PC 10 from the voice data recording and/or reproducing apparatus 20 with reference to FIG. 10. This figure diagrams a data block transferred at a time at the steps S335 and S336.

The byte number 0 represents an end-of-file flag. The end-of-file flag is set to "0" when the current data block terminates the data block transfer and indicates the last data block in the file. By contrast, the end-of-file flag is set to "1" when the next data block exists and files remain to be transferred. By referencing this end-of-file flag, the PC 10 can determine whether the file transfer is terminated.

The byte number 1 represents an ECC flag. The ECC flag indicates whether the data block contains an error correction code as will be described later. The ECC flag is set to "1" when the data block contains the error correction code. Otherwise, it is set to "0".

The byte numbers 2 to 257 and 258 to 513 record encoded voice data (encoded data 1 and 2). This voice data may contain coding errors such as an error during writing to the semiconductor memory 26.

Byte numbers 514 to 521, 525, and 526 are used for reserved areas. These areas contain data irrelevant to data processing or no data.

Byte numbers 522 to 524 record an error correction code for the above-mentioned encoded data 2. Byte numbers 527 to 529 record an error code for the above-mentioned encoded data 1. This error correction code is a redundant code for correcting a 1-bit error in 256-byte data. Such an error may occur during writing to the semiconductor memory 26.

Accordingly, a single transfer operation transfers 512 bytes of voice data. However, an actual transfer operation transfers a total of 530 bytes of data including additional data as mentioned above.

When receiving 512 bytes of data from the voice data recording and reproducing apparatus 20, the PC 10 computes "L-512" and stores the result as a new file size L (step S15H). The PC 10 receives an error correction code from the voice data recording and reproducing apparatus 20 (step S15I), applies error correction to the received 512-byte data using its error correction code, and stores the error-corrected data in memory (step S15J). The PC 10 checks if the file size L newly stored at the step S15H is greater than or equal to 512 bytes (step S15K). If this is true, the PC 10 repeats the processing at the steps S15F to S15K.

When the file size L is smaller than 512 bytes at the step S15K, the PC 10 checks if the parameter specified at the step S11A4 or S11A5 corresponds to a format A (step S15L). If this is true, the conversion method, for example, a data expansion method is set to conversion A which converts format-A data to the PC10's data format (step S15M). Otherwise, the conversion method is set to conversion B which converts format-B data to the PC10's data format (step S15N).

The PC 10 sends a signal requesting transfer of remaining L bytes (n' bytes) of data to the voice data recording and reproducing apparatus 20 (step S15O). The PC 10 receives the n'-byte data and the error correction code and perform the error correction to terminate this sequence of file transfer processing.

Thereafter, the transferred data stored in the memory is converted according to the specified conversion method and is saved as a file. At this time, it may be preferable to check if the size of data stored in the memory matches the file size obtained at the step S15E. When a match is found, data is converted to the file. Otherwise, the data stored in the memory is destroyed and an error indication is displayed on the monitor. The voice data recording and reproducing apparatus 20 may be requested to re-transfer data.

The setup of the data format conversion method is not limited to the above-mentioned step in the flowchart, but may be performed, for example, before sending the file number at the step S15D.

AS mentioned above, a request to transfer the 512-byte data and the corresponding transfer are repeated until data remaining in the file becomes less than 512 bytes. Finally, the PC 10 issues a request to transfer remaining bytes of data (n'-byte block) to the voice data recording and reproducing apparatus 20. Then, the voice data recording and reproducing apparatus 20 transfers the remaining bytes of data to the PC 10 (step S337). At this time, the system control section 25 in the voice data recording and reproducing apparatus 20 terminates this file transfer processing.

When this embodiment records digital data corresponding to a voice signal, the voice data recording and reproducing apparatus 20 generates an error correction code and records it as well as that digital data in the semiconductor memory 26. When that digital data is transferred to the PC 10, the system control section 25 in the voice data recording and reproducing apparatus 20 transfers voice data including the error correction code without error correction. The system control section 25 provides a lower data processing capability than the PC 10's CPU. The PC 10's CPU with a higher data processing capability uses an error correction code contained in the received voice data for performing the error correction of the voice data. Namely, the PC 10 with higher throughput is responsible for error correction which requires long time for data transfer. The voice data recording and reproducing apparatus 20 just transfers data stored in the semiconductor memory 26 without performing time-consuming processing, making it possible to fast transfer data.

According to the prior art, for example, transferring 8-MB data requires 3 minutes and 50 seconds. Our experiment confirmed that this embodiment shortens the transfer time to 1 minute and 30 seconds.

While there has been described a preferred form of the present invention, the present invention is not limited thereto. It is further understood by those skilled in the art that various changes and modifications may be made in the present invention without departing from the spirit and scope thereof.

For example, the transmission apparatus can be an apparatus for recording and reproducing image data and the like instead of the voice data recording and reproducing apparatus 20 for recording and playing back voice data as described in the above example. The USB connection is used between the PC 10 and the voice data recording and/or reproducing apparatus 20 in the above example. However, the present invention is not limited thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transfer system including a transmission apparatus and reception apparatus,
   (i) said transmission apparatus comprising:
      system control means for controlling each section in said transmission apparatus;
      conversion means for converting an input voice signal to a voice file;
      error correction data generation means for generating error correction data based on predetermined data units in said voice file;
      recording means for recording said error correction data as well as said voice file on a storage medium; and
      transmission means for transmitting said voice file and said error correction data recorded on said storage medium based on said predetermined data units, and
   (ii) said reception apparatus comprising:
      a CPU that provides a higher data processing capability than said system control means;
      reception means for receiving said voice file and said error correction data transmitted from said transmission apparatus; and
      first error correction means for performing error correction of said voice file based on said predetermined data units by using said error correction data.

2. The data transfer system according to claim 1, wherein:
   said reception apparatus further comprises transmission request means for generating a transmission request signal in order to request said transmission apparatus to transmit the voice file of said predetermined data units, and
   said transmission means, when receiving said transmission request signal, sends the voice file based on said predetermined data units and corresponding error correction data to said reception apparatus.

3. The data transfer system according to claim 2, wherein said transmission request means requests transmission of next encoded data according to said predetermined data units after said error correction means finishes error correction for said predetermined data units of the voice file.

4. The data transfer system according to claim 1, wherein:
   said transmission apparatus further comprises:
      reading means for reading the voice file and error correction data recorded on said storage medium;
      second error correction means in said transmission apparatus for correcting an error in said voice file by using said error correction data; and
      playback means for playing back a voice file an error-corrected by said second error correction means.

5. The data transfer system according to claim 4, wherein:
   said system control means controls said second error correction means to perform error correction of said voice file when reproducing said voice file in said transmission apparatus and to inhibit error correction of said voice file when transmitting said voice file to said reception apparatus.

6. A data transfer system including a transmission apparatus and a reception apparatus,
   (i) said transmission apparatus comprising:
      A/D converter for converting an input voice signal to digital data;
      DSP for converting said digital data to encoded data;
      first CPU for generating a voice file based on said encoded data and generating error correction data for each of predetermined data units in said voice file;
      memory for storing said voice file and said error correction data; and
      a data transfer section for transmitting said voice file and said error correction data stored in said memory based on said predetermined data units under control of said first CPU, and
   (ii) said reception apparatus comprising:
      a second CPU for receiving said voice file and said error correction data from said transmission apparatus via an external connection interface and performing error correction of said voice file based on each of said predetermined data units by using said error correction data, wherein said second CPU provides a higher performance capability than said first CPU.

7. A data transmission system including a voice reproducing apparatus and reception apparatus, (i) said voice reproducing apparatus comprising:

a storage medium storing a voice file and error correction data for said voice file;

read means for reading said voice file and said error correction data from said storage medium, first error correction means for performing error correction of said read voice file using error correction data;

playback means for playing back said error-corrected voice file; and transmission means for transmitting said read voice file and said error correction data to a reception apparatus, and (ii) said reception apparatus comprising:

reception means for receiving said voice file and said error correction data transmitted from said transmission apparatus; and second error correction means, having a higher data processing capability than said first error correction means, for performing error correction of said voice file using said error correction data.

* * * * *